(12) United States Patent
Yuki

(10) Patent No.: US 10,958,799 B2
(45) Date of Patent: Mar. 23, 2021

(54) IMAGE FORMING APPARATUS AND METHOD FOR CONTROLLING THE SAME

(71) Applicant: KYOCERA Document Solutions Inc., Osaka (JP)

(72) Inventor: Akira Yuki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/672,017

(22) Filed: Nov. 1, 2019

(65) Prior Publication Data

US 2020/0153987 A1    May 14, 2020

(30) Foreign Application Priority Data

Nov. 9, 2018  (JP) .............................. JP2018-211477

(51) Int. Cl.
  *H04N 1/00*    (2006.01)
(52) U.S. Cl.
  CPC ..... *H04N 1/00482* (2013.01); *H04N 1/00411* (2013.01); *H04N 2201/0094* (2013.01)
(58) Field of Classification Search
  CPC combination set(s) only.
  See application file for complete search history.

(56) References Cited

U.S. PATENT DOCUMENTS

| | | | |
|---|---|---|---|
| 2006/0026600 A1* | 2/2006 | Yoshida | H04N 1/00204 719/310 |
| 2007/0013935 A1* | 1/2007 | Uchida | G06F 3/1286 358/1.13 |
| 2008/0198423 A1* | 8/2008 | Ando | H04N 1/00633 358/426.06 |
| 2014/0029055 A1* | 1/2014 | Shimura | G06K 15/40 358/1.16 |
| 2015/0049365 A1* | 2/2015 | Shibata | H04N 1/6097 358/2.1 |
| 2016/0295044 A1* | 10/2016 | Nakamura | G03G 15/6529 |
| 2017/0038710 A1* | 2/2017 | Tamura | G03G 15/2046 |
| 2019/0048526 A1* | 2/2019 | Kettunen | G01L 5/108 |
| 2020/0153987 A1* | 5/2020 | Yuki | H04N 1/00482 |

FOREIGN PATENT DOCUMENTS

JP    2008-65467 A    3/2008

* cited by examiner

*Primary Examiner* — Helen Zong
(74) *Attorney, Agent, or Firm* — Stein IP, LLC

(57) ABSTRACT

An image forming apparatus includes a storage medium, an operation panel, and a controller. The storage medium stores therein a paper-type profile which includes paper information and control information. When an operation to make the paper-type profile belong to a medium family has been performed, the controller attaches, to the paper-type profile, information indicating the medium family to which the paper-type profile belongs. When an operation to make the paper-type profile belong to a device family has been performed, the controller attaches, to the paper-type profile, information indicating the device family to which the selected paper-type profile belongs.

7 Claims, 7 Drawing Sheets

FIG.7

| No. | Paper Name | Maker | Size | Coat | |
|---|---|---|---|---|---|
| 001 | AAAA | ○○○○ | A4 | Yes | |
| 002 | BBBB | □□□□ | Letter | No | |
| 003 | CCCC | △△△△ | A4 | Yes | |
| 004 | DDDD | ◇◇◇◇ | Letter | No | 1/20 |
| 005 | EEEE | ○○○○ | A4 | Yes | |
| 006 | FFFF | □□□□ | Letter | No | |
| 007 | GGGG | △△△△ | A4 | Yes | |
| 008 | HHHH | ◇◇◇◇ | Letter | No | |

Paper Selection — Medium Family: All — Device Family: All — OK

FIG.8

| No. | Paper Name | Maker | Size | Coat | |
|---|---|---|---|---|---|
| 001 | AAAA | ○○○○ | A4 | Yes | |
| 002 | BBBB | □□□□ | Letter | No | |
| 005 | EEEE | ○○○○ | A4 | Yes | |
| 006 | FFFF | ○○○○ | Letter | No | |
| 009 | IIII | ○○○○ | A4 | Yes | 1/5 |
| 010 | JJJJ | □□□□ | Letter | No | |
| 012 | KKKK | □□□□ | Letter | No | |
| 014 | LLLL | □□□□ | Letter | No | |

Paper Selection — Medium Family: All — Device Family: α α α α — OK

FIG.9

| No. | Paper Name | Maker | Size | Coat | |
|---|---|---|---|---|---|
| 002 | BBBB | ☐☐☐☐ | Letter | No | |
| 010 | JJJJ | ☐☐☐☐ | Letter | No | |
| 012 | KKKK | ☐☐☐☐ | Letter | No | |
| 014 | LLLL | ☐☐☐☐ | Letter | No | |
| 025 | MMMM | ☐☐☐☐ | Letter | No | |
| 050 | NNNN | ☐☐☐☐ | Letter | No | |

Paper Selection

Medium Family: β β β β
Device Family: α α α α

OK

IMAGE FORMING APPARATUS AND METHOD FOR CONTROLLING THE SAME

INCORPORATION BY REFERENCE

This application is based upon and claims the benefit of priority from the corresponding Japanese Patent Application No. 2018-211477 filed on Nov. 9, 2018, the entire contents of which are incorporated herein by reference.

BACKGROUND

The present disclosure relates to an image forming apparatus that stores information about each of various types of paper for printing.

Examples of image forming apparatuses include multifunction peripherals and printers, for example. An image forming apparatus performs printing on a sheet. Various types of sheets are used for printing. Some image forming apparatuses for office use are configured to allow selection of what type of sheet to use. One type of sheet to be used can be selected from a plurality of types of sheets including, for example, regular paper, recycled paper, OHP films, and glossy paper. The following technology is known as a technology relating to the custom setting of the type of sheet to be used in an image forming apparatus.

Specifically, there has been disclosed an image forming apparatus that checks whether or not an inputted paper-type name overlaps with whichever one of paper-type names already stored in a data base, and, if there is such overlapping, makes a notification to that effect via a display panel. This technology is designed for the purpose of avoiding inconveniences such overlapping between paper-type names would cause.

High-quality printing is required in commercial printing (industrial printing). The quality of printing needs to meet or exceed the quality that customers expect. It can be said that image forming apparatuses for commercial printing are demanded to provide a higher printing quality than those for use in offices or households. That is, image forming apparatuses for commercial printing are for professionals. For example, image forming apparatuses for commercial printing are adjusted so as to suffer less printing-position misalignment than office-use image forming apparatuses.

Operating an image forming apparatus in a manner suitable to characteristics of a sheet can help achieve further improvement in the quality of printing. Thus, some image forming apparatuses for commercial printing are designed such that a profile (a medium profile) of sheet to be used can be registered. The profile includes information indicating features and characteristics of the sheet. For example, a paper manufacturer creates profile of paper.

Such a profile includes, for example, the size, the grammage, the ICC profile, etc. of the paper. The ICC profile is data conforming to the standards promulgated by the International Color Consortium (ICC). The ICC profile is data that includes mapping data for changing color space. An image forming apparatus refers to the profile to prepare image data.

Image forming apparatuses for commercial printing perform printing on various types of paper. The number of the types of paper on which an image forming apparatus performs printing may be several hundreds. In such a case, several hundreds of types of profiles are installed in the image forming apparatus. To perform printing, it is necessary to pick out the profile of a type of paper on which printing is to be performed from among the several hundreds of profiles. It sometimes takes a long time to select a profile or to make a fine adjustment.

The known technology described above is a technology where a warning is issued if the name of the type of paper that is about to be registered has already been used. It is basically a technology where paper types are managed on a one-by-one basis. Thus, this technology is ineffective to solve the above-described inconvenience.

SUMMARY

According to an aspect of the present disclosure, an image forming apparatus includes a storage medium, an operation panel, and a controller. The storage medium stores therein a paper-type profile, which is information about paper to be used and includes paper information and control information. The operation panel accepts selection of the paper-type profile. The printing unit performs printing. The controller 1 controls printing based on the paper-type profile of paper having been selected on the operation panel. The paper information is information indicating a characteristic of paper. The control information includes a set value of a control item for controlling printing. The operation panel accepts an operation to make the paper-type profile having been selected belong to a medium family based on the paper information. The operation panel accepts an operation to make the paper-type profile having been selected belong to a device family based on a unit of the control information. The controller attaches, to the paper-type profile, information indicating the medium family to which the paper-type profile belongs, when the operation to make the paper-type profile belong to the medium family has been performed. The controller attaches, to the paper-type profile, information indicating the device family to which the paper-type profile belongs, when the operation to make the paper-type profile belong to the device family has been performed.

Further features and advantages of the present invention will become apparent from the description of embodiments given below.

BRIEF DESCRIPTION OF THE DRAWINGS

FIG. 7 is a diagram showing an example of a procedure of selecting paper to be used in the image forming apparatus according to the embodiment.

FIG. 8 is a diagram showing an example of the procedure of selecting paper to be used in the image forming apparatus according to the embodiment.

FIG. 9 is a diagram showing an example of the procedure of selecting paper to be used in the image forming apparatus according to the embodiment.

DETAILED DESCRIPTION

According to the present disclosure, it is possible to classify registered paper-type profiles (profiles) based on a plurality of standards. Hereinafter, with reference to FIG. 1 to FIG. 9, an embodiment of the present disclosure will be described. The following description will deal with an image forming apparatus 100, which is a printer, as an example of image forming apparatuses. The image forming apparatus 100 may be a multifunction peripheral, instead. The image forming apparatus 100 is an apparatus for commercial printing. For example, the image forming apparatus 100 is capable of performing printing on 100 or more sheets of A4 paper per minute. The image forming apparatus 100 described below performs printing by using ink. Here, the image forming apparatus 100 may be an electro-photographic printer.

(Outline of Image Forming Apparatus 100)

Figure 1:
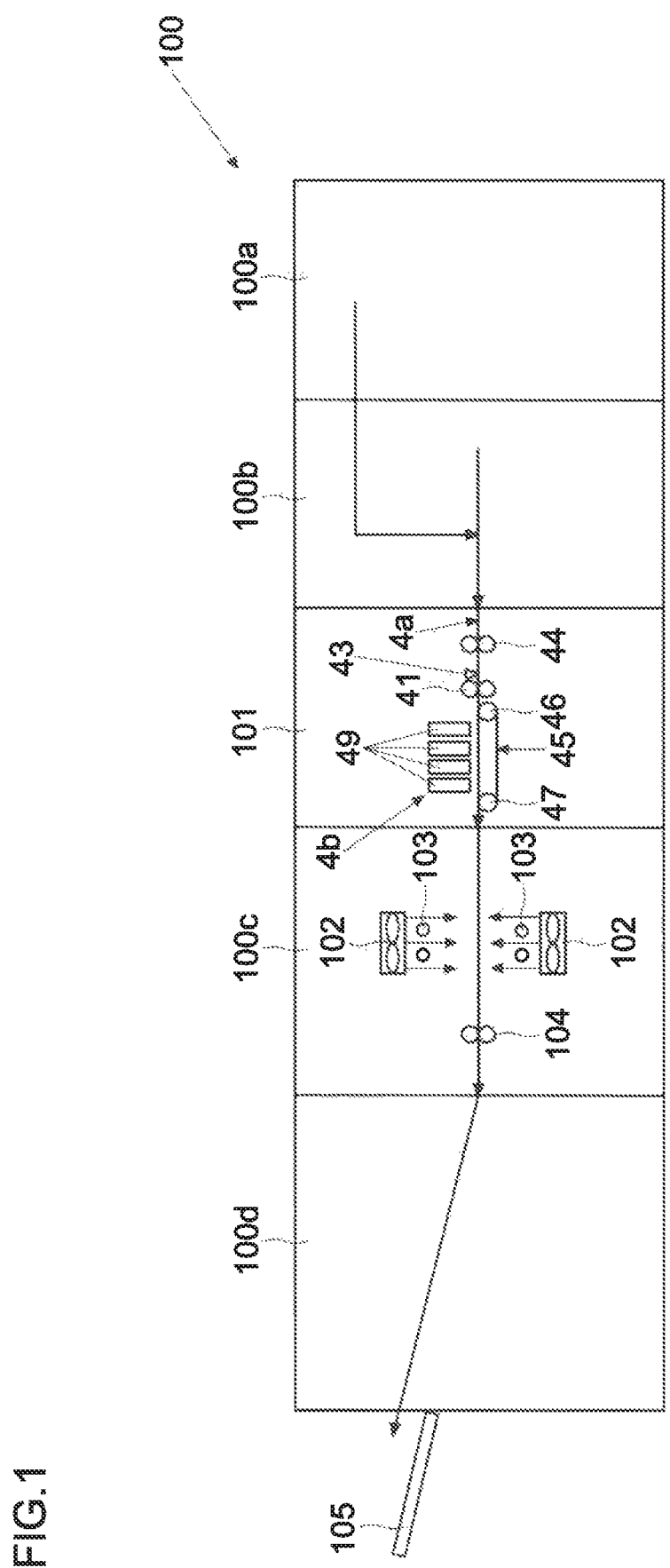
FIG. 1 is a diagram showing an example of an image forming apparatus according to an embodiment.

First, with reference to FIG. 1 and FIG. 2, a description will be given of the outline of the image forming apparatus 100 according to the embodiment. As shown in FIG. 1, the image forming apparatus 100 includes a first paper containing device 100a, a second paper containing device 100b, a main body device 101, a first post processing device 100c, and a second post processing device 100d. In FIG. 1, a solid arrow indicates a paper conveyance direction (flow of paper). The first paper containing device 100a and the second paper containing device 100b are coupled (connected) to each other. The second paper containing device 100b and the main body device 101 are coupled (connected) to each other. The main body device 101 and the first post processing device 100c are coupled (connected) to each other. The first post processing device 100c and the second post processing device 100d are coupled (connected) to each other.

Sheets of paper are contained in the first and second paper containing devices 100a and 100b. The second paper containing device 100b is located closer to the main body device 101 than the first paper containing device 100a. The first paper containing device 100a and the second paper containing device 100b each include a plurality of paper cassettes. A sheet of paper is fed from whichever one of the paper cassettes in printing. The first paper containing device 100a and the second paper containing device 100b each include a plurality of rollers for feeding a sheet of paper, and a plurality of pairs of rollers for conveying a sheet of paper. When feeding a sheet of paper from the first paper containing device 100a, the first paper containing device 100a sends the sheet of paper to the second paper containing device 100b. The second paper containing device 100b sends the sheet of paper to the main body device 101. When feeding a sheet of paper from the second paper containing device 100b, the first paper containing device 100a does not operate. The second paper containing device 100b sends the sheet of paper to the main body device 101.

The main body device 101 performs printing on the sheet of paper. In double-side printing, the main body device 101 switches back the sheet of paper after printing is performed on one side. As a result of the switchback, the paper is turned upside down. Then, the main body device 101 performs printing on the other side of the sheet of paper. After the printing is completed on the sheet of paper, the main body device 101 sends it to the first post processing device 100c.

The first post processing device 100c is a device that dries the sheet of paper (ink) and corrects curl of the sheet of paper. The main body device 101 performs printing by using ink. The first post processing device 100c includes a fan 102 and a heater 103 for drying ink. The fan 102 blows wind to the sheet of paper having been sent from the main body device 101. The heater 103 is provided for the purpose of sending warm wind to the sheet of paper. The heater 103 heats air flowing to the fan 102. Thereby, it is possible to dry the ink. The first post processing device 100c further includes a decurl roller pair 104. The decurl roller pair 104 applies pressure to the sheet of paper. The first post processing device 100c includes a plurality of roller pairs that conveys the sheet of paper. After drying, and correcting the curl of, the sheet of paper, the first post processing device 100c sends it to the second post processing device 100d.

The second post processing device 100d includes a plurality of roller pairs for paper conveyance. The second post processing device 100d is a device that discharges the sheet onto a discharge tray 105. The second post processing device 100d is capable of turning the paper upside down to make a front side of the paper face down.

Figure 2:
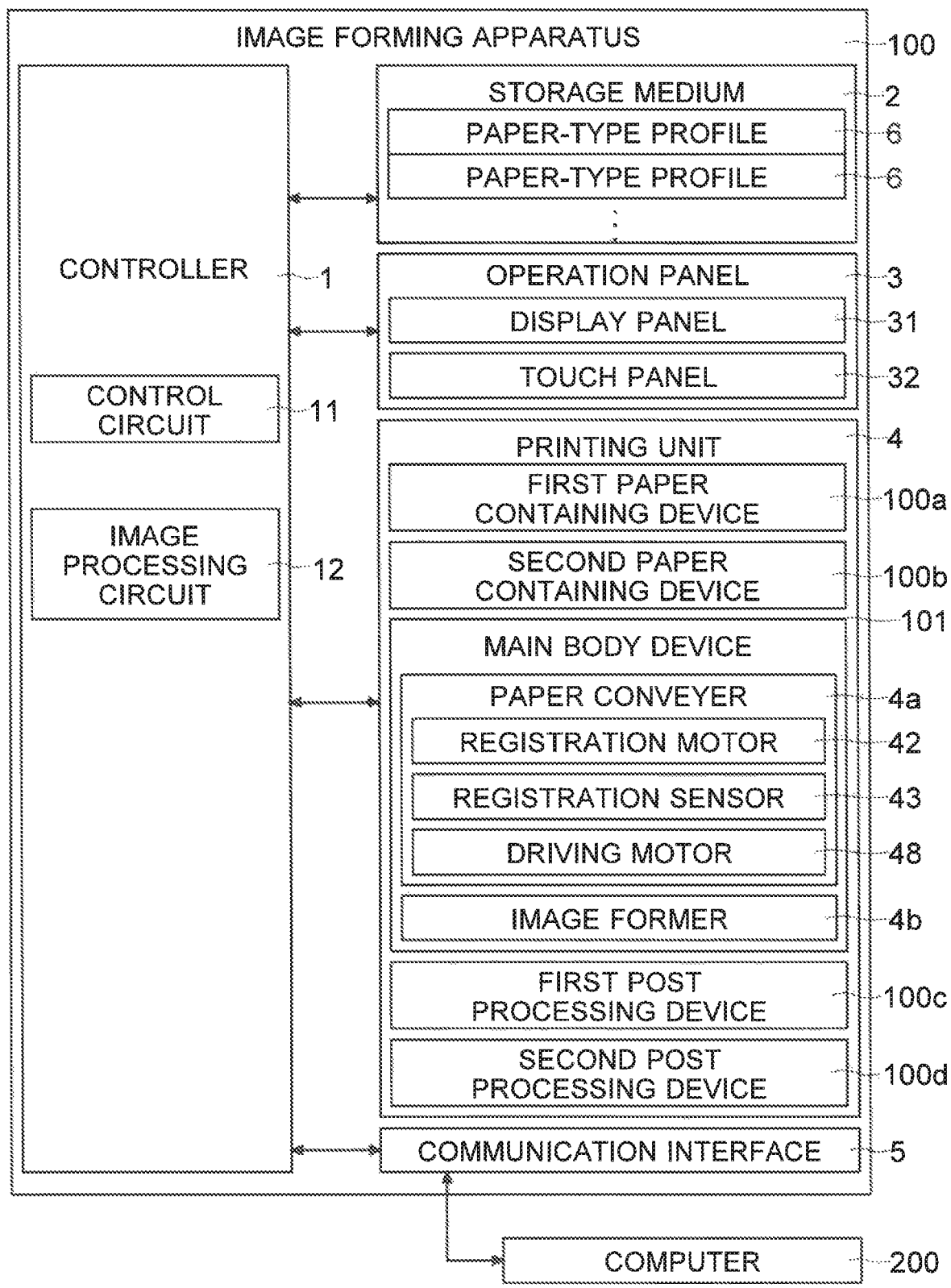
FIG. 2 is a diagram showing the example of the image forming apparatus according to the embodiment.

As shown in FIG. 2, the image forming apparatus 100 includes a controller 1, a storage medium 2, an operation panel 3, a printing unit 4, and a communication interface 5 (a communication circuit). The controller 1 is a board (a control board) that controls portions and components of the image forming apparatus 100. The controller 1 includes a control circuit 11 and an image processing circuit 12. The control circuit 11 is, for example, a CPU. The control circuit 11 performs calculation and processing based on control programs and control data stored in a storage medium 2. The image forming apparatus 100 includes, as the storage medium 2, a nonvolatile storage device, such as a ROM and a storage (an HDD, a flash ROM), and a volatile storage device, such as a RAM. The image processing circuit 12 performs image processing on image data to be used for printing.

The image forming apparatus 100 includes the operation panel 3. The operation panel 3 includes a display panel 31 and a touch panel 32. The controller 1 makes the display panel 31 display a setting screen, information, etc. The display panel 31 displays operation images such as images of a key, a button, and a tab. The touch panel 32 detects a touch operation performed with respect to the display panel 31. Based on an output of the touch panel 32, the controller 1 recognizes which of the operation images has been operated. The controller 1 thus recognizes a setting operation having been performed by a user.

The image forming apparatus 100 includes the printing unit 4. The printing unit 4 includes the first paper containing device 100a, the second paper containing device 100b, part of the main body device 101, the first post processing device 100c, and the second post processing device 100d, The main body device 101 includes, as the printing unit 4, a paper conveyer 4a and an image former 4b. In a print job, the controller 1 controls operations of the printing unit 4.

The controller 1 recognizes a paper cassette from which a sheet of paper is to be fed. Each paper cassette is provided with a paper feeding roller. In a print job, the controller 1 rotates the paper feeding roller of the paper cassette from which a sheet of paper is to be fed. To feed a sheet of paper from the second paper containing device 100b, the controller 1 controls such that the sheet of paper is conveyed inside the second paper containing device 100b. The controller 1 makes the paper enter the paper conveyer 4a of the main body device 101. To feed a sheet of paper from the first paper containing device 100a, the controller 1 controls such that the sheet of paper is conveyed inside the first paper containing device 100a. The controller 1 makes the sheet of paper enter the second paper containing device 100b. Then, the controller 1 controls such that the sheet of paper fed from the first paper containing device 100a is conveyed inside the second paper containing device 100b. Then, the controller 1 makes the sheet of paper enter the paper conveyer 4a of the main body device 101.

The paper conveyer 4a conveys the sheet of paper toward the image former 4b. The paper conveyer 4a includes a conveyance path and a registration roller pair 41. To rotate the registration roller pair 41, a registration motor 42 is provided. The controller 1 controls rotation of the registration motor 42 to control rotation of the registration roller pair 41.

The main body device 101 further includes a registration sensor 43. The registration sensor 43 is disposed upstream of the registration roller pair 41 in a paper conveyance direction. An output level of the registration sensor 43 depends on whether or not presence of paper has been detected. An output of the registration sensor 43 is fed to the controller 1. Based on the output of the registration sensor 43, the controller 1 recognizes that a leading end of the sheet of paper has reached the registration sensor 43. The controller 1 also recognizes that a rear end of the sheet of paper has passed the registration sensor 43.

At a time point when the sheet of paper reaches the registration roller pair 41, the controller 1 has the registration roller pair 41 in a non-operating state. For example, when it is recognized that the rear end of the sheet of paper has passed the registration sensor 43, the controller 1 makes the registration roller pair 41 stop rotating. Meanwhile, the controller 1 rotates a conveyance roller pair 44, which is one of the roller pairs for paper conveyance that is located upstream of the registration roller pair 41. The leading end of the sheet of paper strikes against the registration roller pair 41, and the sheet of paper becomes bent. Elasticity of the sheet of paper causes its leading end to become parallel with a nip of the registration roller pair 41. As a result, skew of the sheet of paper is corrected. When a predetermined standby time has elapsed after it is recognized, based on the output of the registration sensor 43, that the leading end of the sheet of paper has reached the registration roller pair 41, the controller 1 starts to rotate the registration roller pair 41. Thereby, the sheet of paper is sent out to a conveyance belt 45.

The conveyance belt 45 is wound around and between a driving roller 46 and a driven roller 47. Here, the conveyance belt 45 attracts the paper thereto. For example, an attraction device is provided to apply voltage to the conveyance belt 45. The conveyance belt 45 attracts the sheet of paper thereto by means of electrostatic force. This prevents misalignment of the sheet of paper in printing. A driving motor 48 is provided to rotate the driving roller 46. In a print job, the controller 1 rotates the driving motor 48 to rotate the conveyance belt 45.

The image former 4b performs printing with respect to a sheet of paper having been conveyed thereto. In other words, the image former 4b ejects ink onto the sheet of paper having been conveyed thereto to thereby record an image on the paper. Image data for printing is fed from the image processing circuit 12. As shown in FIG. 1 and FIG. 2, the image former 4b includes four line heads 49. Of the four line heads 49, one ejects black ink, another ejects yellow ink, another ejects cyan ink, and the other ejects magenta ink. The line heads 49 are each fixed. The line head 49 are disposed above the conveyance belt 45. The four line heads 49 are each spaced from the conveyance belt 45 by a uniform gap. The sheet of paper passes through the gap.

The line heads 49 each include a plurality of nozzles. The nozzles each have an opening facing the conveyance belt 45. Ink is ejected from each of the nozzles. The ink impacts on the sheet of paper under conveyance. Thereby, an image is recorded (formed) on the sheet of paper. For each line head 49, there is provided an ink replenishment mechanism (not shown) to supply ink to each line head 49.

The controller 1 is connected to the communication interface 5. The communication interface 5 includes communication hardware (a connector, a communication control circuit, and a communication memory). The communication memory stores communication software therein. The communication interface 5 communicates with a computer 200. The computer 200 is a personal computer or a server, for example. The controller 1 receives printing data from the computer 200. The printing data includes settings for printing and contents to be printed. The printing data includes data described in a page description language. The controller 1 (the image processing circuit 12) analyzes the received (fed) printing data. Based on the received printing data, the controller 1 generates image data (raster data) to be used for image formation performed in the image former 4b.

In the print job, the controller 1 makes the first post processing device 100c dry the sheet of paper. The controller 1 also makes the second post processing device 100d discharge the sheet of paper onto the discharge tray 105 after printing is completed on the sheet of paper.

(Paper-Type Profile 6)

Next, with reference to FIG. 3, a description will be given of an example of a paper-type profile 6 according to the embodiment. The image forming apparatus 100 is a printing apparatus for commercial printing. The image forming apparatus 100 is a printing apparatus for performing high-quality, high-speed printing. For improvement of the quality of printed matters, the controller 1 makes the printing unit 4 perform an operation suitable for paper to be used.

For the image forming apparatus 100 to perform printing, there needs to be made selection of paper to be used for the printing. The selection is necessary for the image forming apparatus 100 to perform printing in a manner suitable to the paper. The storage medium 2 stores therein the paper-type profile 6. The paper-type profile 6 is paper information. As shown in FIG. 3, as the paper-type profile 6, the storage medium 2 stores therein a plurality of paper-type profiles 6, one for each type of paper.

The operation panel 3 accepts selection of such one of the paper-type profiles 6 stored in the storage medium 2 as corresponds to paper to be used for printing. The controller 1 recognizes that the paper corresponding to the selected paper-type profile 6 is the paper to be used for the printing. In other words, the operation panel 3 accepts the selection of paper to be used. Here, the selection of paper to be used can be made by using the computer 200, which is connected to the image forming apparatus 100 via the communication interface 5. In such a case, the computer 200 and its input device (a mouse, a keyboard, or the like) functions as an operation panel which accepts the selection of paper.

The storage medium 2 stores therein the paper-type profiles 6 in a nonvolatile manner. The paper-type profiles 6 each include paper information 7 and control information 8. The paper information 7 is information that indicates s characteristic of the paper. The paper information 7 also is information that is independent of the device (the image forming apparatus 100). The control information 8 includes a value set for a control item of the printing unit 4. The control information 8 is information dependent on performance of the device (the image forming apparatus 100).

Figure 3:
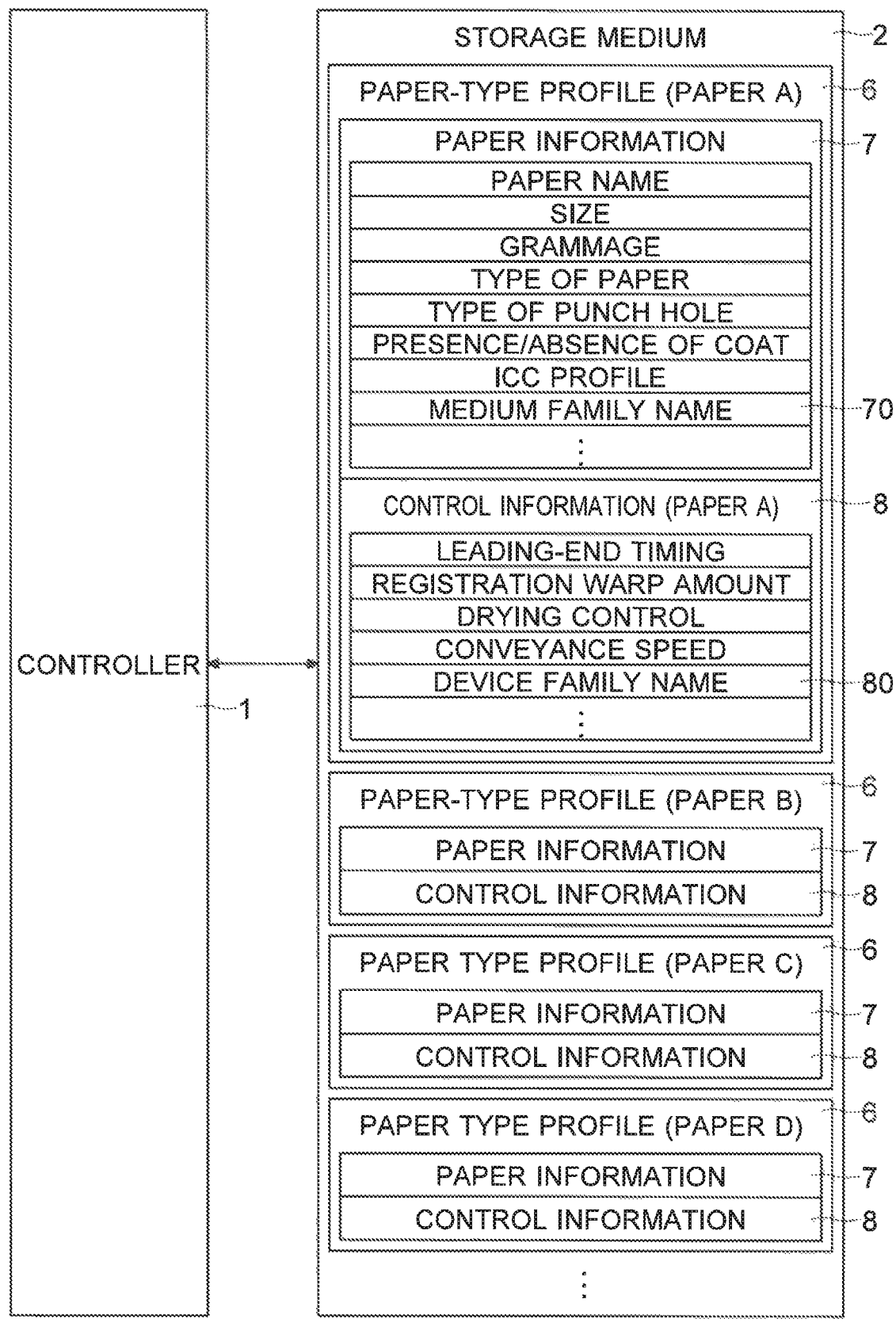
FIG. 3 is a diagram showing an example of a paper-type profile according to the embodiment.

As shown in FIG. 3, the paper information 7 includes information about each of items such as the name, the size, the grammage (weight per unit area), the type, the punchhole type, the presence/absence of coat, the ICC profile, the medium family name 70, etc. of the paper. Another item may also be included in the paper information 7. The paper type and the presence/absence of coat relate to the surface roughness of the paper. The ICC profile, which is a format for Color Management System, is data that describes color reproduction characteristics.

The paper information 7 is also referred to as medium profile (paper profile). The paper information 7 is often prepared and provided by paper maker companies or paper sales companies. The paper information 7 can be created by the user. The storage medium 2 has the paper information 7 of each of main paper types installed therein in advance. When using a new type of paper, it is possible to additionally install the paper information 7 of the new type of paper in the storage medium 2. A description of installation of the paper information 7 will be given later.

The control information 8 includes control items such as the leading-end timing, the registration warp amount, the drying control, and the conveyance speed. The control information 8 includes set values (specific values) determined with respect to these items.

The leading-end timing is a time from when the registration roller pair 41 starts rotating until when ink ejection (image formation) is started. Thereby, it is possible to adjust a printing starting position (position of a leading line printed in a page). Thus, printing can be performed at an appropriate position. In particular, in double-side printing, ink is ejected when printing is performed on the first surface (the front side). The ink causes the sheet of paper to swell and expend. When printing is performed again on to the second surface (back side) of the thus expanded sheet of paper and then the paper is dried, printing positions on the two sides may obviously be misaligned. By adjusting the leading-end timing, it is possible to reduce such misalignment of the printing positions on the front and back sides of a printed matter after being dried.

The registration warp amount is a time from when the reaching of the leading end of the paper is detected by the registration sensor 43 until when rotation of the registration roller pair 41 is started. The appropriate registration warp amount for paper depends on the thickness, the roughness, and the material of the paper. The registration warp amount is set so as not to cause either insufficient or too much warping of the paper.

The drying control relates to drying performed in the first post processing device 100*c*. For example, a speed and a temperature of warm wind from the fan 102 are determined as set values. When a strong wind is applied to a sheet of thin paper, a paper jam is likely to occur. On the other hand, a sheet of thick paper cannot be fully dried with a weak wind. The values of the speed and the temperature of warm wind from the fan 102 are set so as to achieve appropriate drying of paper. The conveyance speed is a speed at which a sheet of paper is conveyed in the image forming apparatus 100. Too fast sheet conveyance increases the tendency of a sheet to be stuck. Different types of paper have different levels of tendency to be stuck. The conveyance speed for each type of paper is set such that a sheet of the paper can be appropriately conveyed and can have printing appropriately performed thereon.

The controller 1 controls the printing unit 4 based on the control information 8 o the selected paper-type profile 6. The controller 1 determines a time point to start ink ejection (image formation) on the leading line of the page based on the set value of the leading-end timing. Further, the controller 1 warps the paper based on the set value of the registration warp amount. Further, the controller 1 makes the first post processing device 100*c* perform drying of the sheet of paper based on the set value of the drying control. The controller 1 makes the printing unit 4 convey the sheet of paper based on the set value of the conveyance speed.

(Paper Registration)

Figure 4:
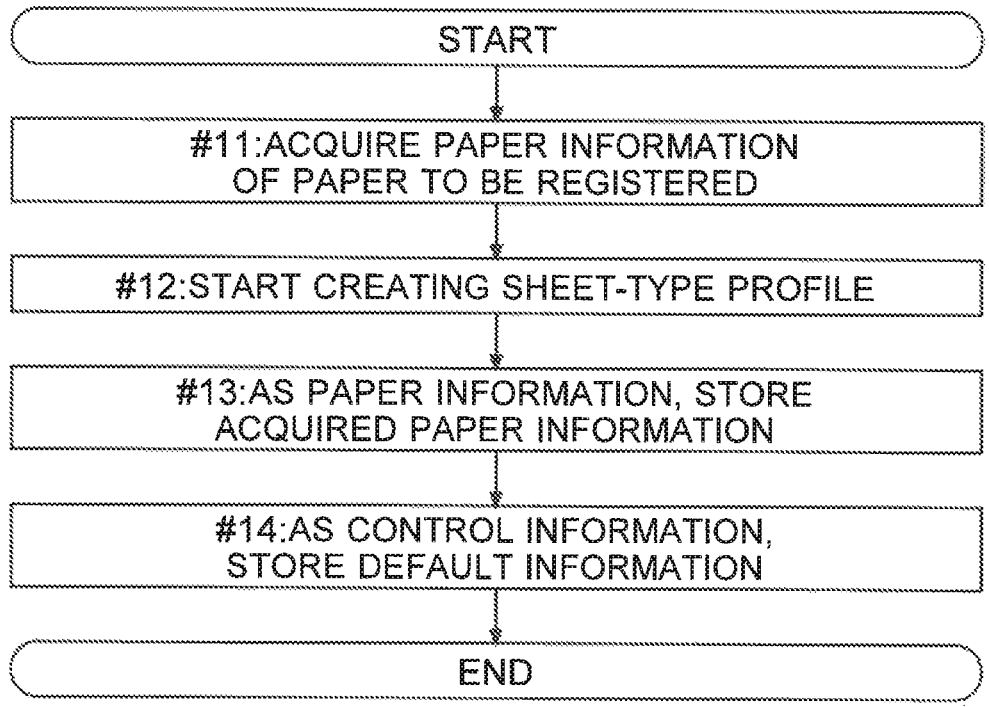
FIG. 4 is a diagram showing an example of a procedure of registering a paper-type profile performed in the image forming apparatus according to the embodiment.

Next, with reference to FIG. 4, a description will be given of an example of a procedure of registering paper in the image forming apparatus 100 according to the embodiment. "START" in FIG. 4 is a time point at which the registration of a paper-type profile 6 is started. The user stores (registers), in the storage medium 2, a paper-type profile 6 of paper that he or she wishes to use. In other words, the user can create a new paper-type profile 6 to register the paper. The operation panel 3 accepts an instruction to start the registration of the new paper-type profile 6. When the operation panel 3 has accepted the instruction to start the registration of the new paper-type profile 6, the controller 1 makes the display panel 31 display a paper-type profile registration screen.

First, the controller 1 acquires the paper information 7 of the paper that is to be registered (step #11). The operation panel 3 accepts, on the paper-type profile registration screen, a setting of a place where the paper information 7 is to be acquired. In a case where the paper information 7 (paper profile) is disclosed in a site (a server) of a paper maker that has produced the paper, the user inputs an operation on the operation panel 3 to download the paper information 7. In this case, the controller 1 makes the communication interface 5 acquire the paper information 7 that has been selected on the operation panel 3 to be downloaded.

The paper information 7 may be acquired by using a portable memory. The portable memory is, for example, a USB memory, a portable memory card, etc. The user stores, in the portable memory, the paper information 7 of the paper that he or she wishes to use (register). The image forming apparatus 100 has a memory interface (not shown). The memory interface includes, for example, a connector and a socket based on the USB standard. The controller 1 acquires the paper information 7 from the portable memory connected to the memory interface.

Next, the controller 1 starts to create a paper-type profile 6 based on the paper information 7 (step #12). The controller 1 stores the acquired paper information 7 in a region for storing the paper information 7 in the paper-type profile 6 (step #13). The controller 1 stores default control information 8 in a region for storing the control information 8 in the paper-type profile 6 (step #14). The default (Standard) control information 8 is determined in advance. The storage medium 2 stores therein the default control information 8 in a nonvolatile manner. All paper-type profiles 6 have the same control information 8 at the time when they are newly registered. Then, the flow ends (END).

When a new paper-type profile 6 is registered in the storage medium 2, the controller 1 may make the printing unit 4 perform test printing. In this case, the test printing is performed by using paper corresponding to the newly registered paper-type profile 6. The user may adjust a set value included in the control information 8 of the newly registered paper-type profile 6 based on a result of the test printing. In this case, the operation panel 3 accepts the change of the set value included in the control information 8 of the new (newly registered) paper-type profile 6. Based on the accepted change, the controller 1 makes the storage medium 2 change the set value included in the control information 8 of the new paper-type profile 6. The control information 8 can be adjusted at the time of new registration.

(Family Setting)

Figure 5:
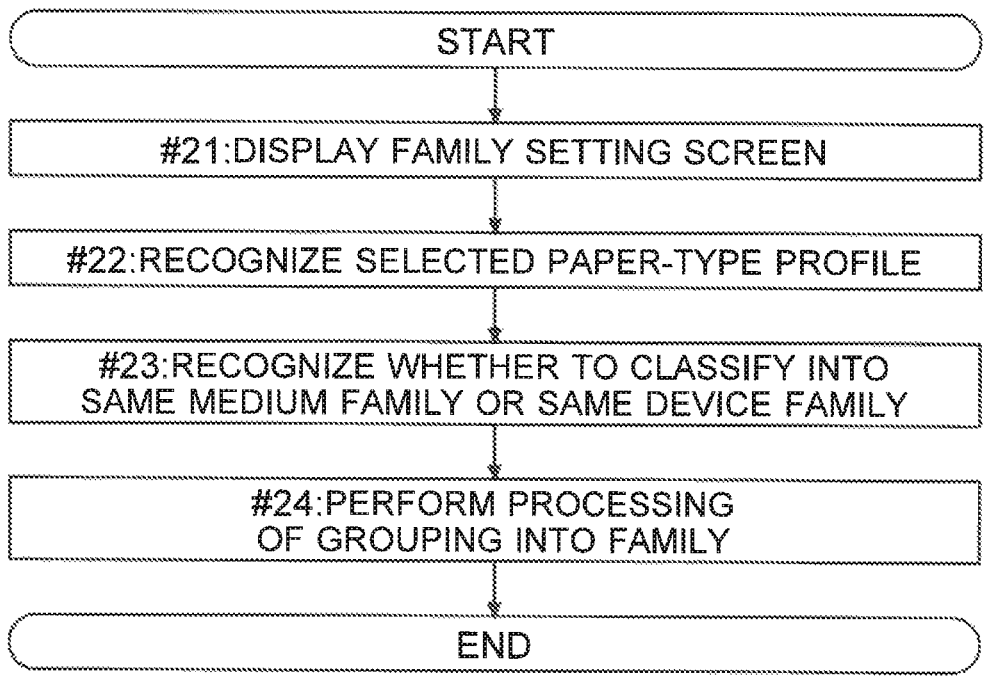
FIG. 5 is a diagram showing an example of a procedure of family setting according to the embodiment.

Next, with reference to FIG. 5, a description will be given of an example of family setting in the paper-type profile 6 according to the embodiment. In the image forming apparatus 100, it is possible to perform family setting for classification of paper (paper-type profiles 6). In other words, paper-type profiles 6 can be divided into groups. The operation panel 3 accepts an operation (a family-setting starting operation) to start the family setting. "START" in FIG. 5 is a time point at which the controller 1 recognizes, based on the output of the operation panel 3, that the operation to start the family setting has been performed.

The controller 1 makes the display panel 31 display a screen (a family setting screen) for performing the family setting (step #21). On the family setting screen, it is possible to select two or more paper-type profiles 6 to be grouped into a same family (group). For example, when four paper-type profiles 6 are selected, it is possible to set the four paper-type profiles 6 in the same family by a single operation. The controller 1 recognizes the selected paper-type profiles 6 based on the output of the operation panel 3 (step #22).

Further, on the family setting screen, it is also possible to select whether to group the selected paper-type profiles 6 into a same medium family or into a same device family. The grouping into the medium family is based on the paper information 7. Such paper-type profiles 6 as can be regarded to have similar paper information 7 can be grouped into the same medium family. The grouping into the device family is based on the control information 8. If it is possible to obtain a printed matter of an allowable image quality by performing printing based on whichever of paper-type profiles 6 by using the same control information 8, the paper-type profiles 6 can be grouped into the same device family.

The controller 1 recognizes, based on the output of the operation panel 3, whether or not the selected paper-type profiles 6 are to be grouped into the same medium family or into the same device family (step #23). In other words, the controller 1 confirms whether the medium family setting has been performed to group the selected paper-type profiles 6 into a medium family or the device family setting has been performed to group the selected paper-type profiles 6 into a device family.

Based on the setting, the controller 1 performs the processing of grouping into a family (step #24). In the processing of grouping into a family, the controller 1 attaches a family name to each of the selected paper-type profiles 6. Based on the family name attached to each paper-type profile 6, the controller 1 can recognize the family to which each paper-type profile 6 belongs. The flow ends when the processing of grouping into a family is finished (END).

Specifically, when the medium family setting has been performed, the controller 1 attaches a medium family name 70 to the paper information 7 (paper-type profile 6) of each of the selected paper-type profiles 6 in the following manner.

(1) When none of the selected paper-type profiles 6 belong to any medium family, the controller 1 attaches a new (unused) medium family name 70 to the paper information 7 of each of the selected paper-type profiles 6.

(2) When any of the selected paper-type profiles 6 already have medium family names 70 attached thereto, and the medium family names 70 are of one single kind, the controller 1 attaches the same attached family name 70 to the paper information 7 of each of the other ones of the selected paper-type profiles 6 that do not have a medium family name attached thereto yet.

(3) When any of the selected paper-type profiles 6 already have medium family names 70 attached thereto, and the attached medium family names 70 are of two or more kinds, the operation panel 3 accepts selection of a medium family name 70. The controller 1 attaches the selected medium family name 70 to the paper information 7 of each of the selected paper-type profiles 6.

The medium family name 70 may be a number of two or more digits, or may be a string of two or more letters, for example. Further, the operation panel 3 may accept input of letters, digits, and signs used as the medium family name 70. One of the paper names in the paper-type profiles 6 belonging to the medium family may be used as the medium family name 70.

When the device family setting has been performed, the controller 1 attaches a device family name 80 to the control information 8 (paper-type profile 6) of each of the selected paper-type profiles 6 in the following manner.

(1) When none of the selected paper-type profiles 6 belong to any device family, the controller 1 attaches a new (unused) device family name 80 to the control information 8 of each of the selected paper-type profiles 6.

(2) When any of the selected paper-type profiles 6 already have device family names 80 attached thereto, and the attached device family names 80 are of one single kind, the controller 1 attaches the already attached device family name 80 to the control information 8 of each of those without a device family name.

(3) When any of the selected paper-type profiles 6 already have device family names 80 attached thereto, and the attached device family names 80 are of two or more kinds, the operation panel 3 accepts selection of a device family name 80. The controller 1 attaches the selected device family name 80 to the control information 8 of each of the selected paper-type profiles 6.

The device family name 80 may be a number of two or more digits, or may be a string of two or more letters, for example. Further, the operation panel 3 may accept input of letters, digits, and signs used as the device family name 80. One of the paper names in the paper-type profiles 6 belonging to the device family may be used as the device family name 80.

(Correction of Control Information 8)

Figure 6:
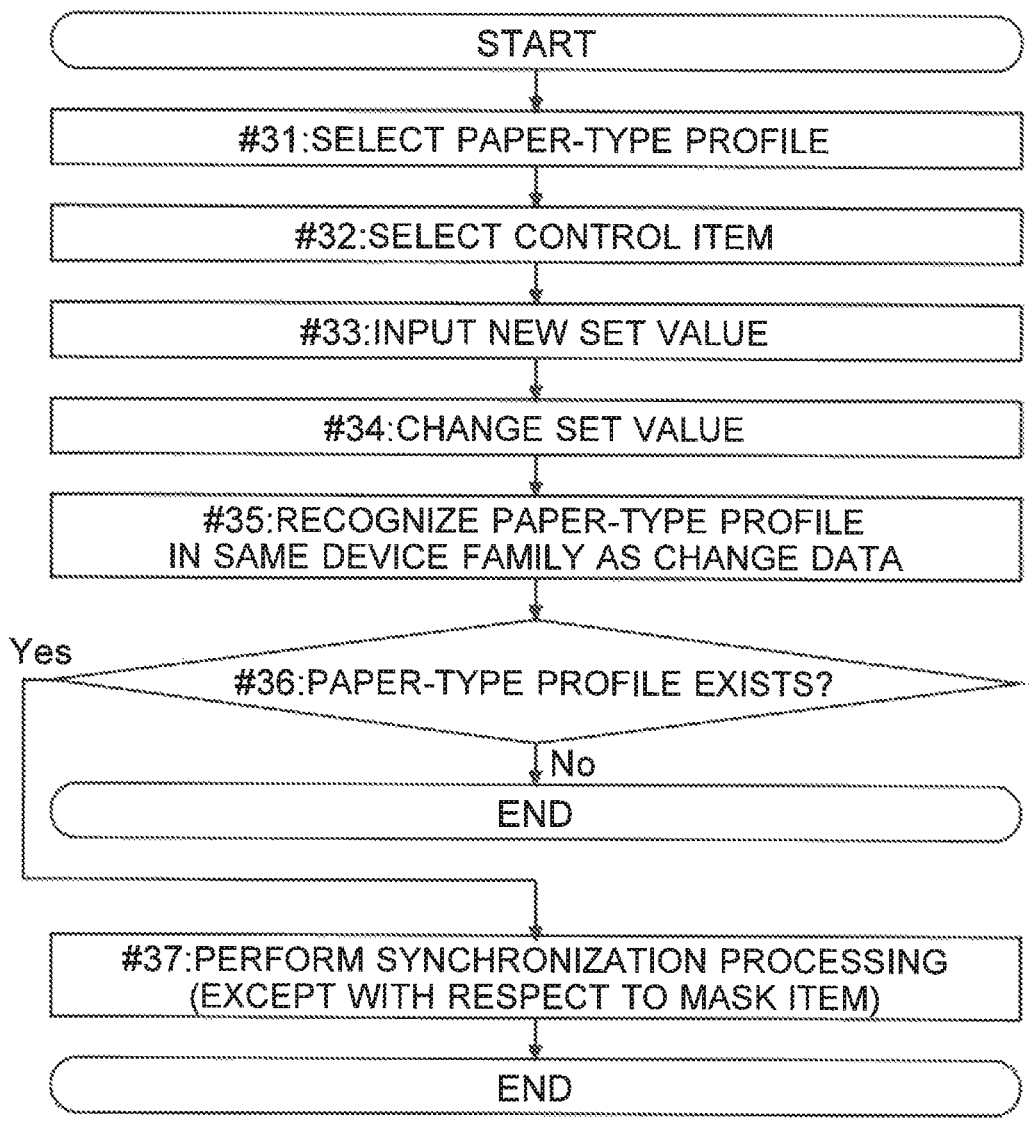
FIG. 6 is a diagram showing an example of a procedure of correcting control information according to the embodiment.

Next, with reference to FIG. 6, a description will be given of an example of a procedure of correcting the control information 8 according to the embodiment. A need sometimes arises to correct the control information 8 to improve the quality of printed matters. Further, a need sometimes arises to adjust the control information 8 in accordance with different seasons of the year. For example, there are cases where it is necessary to change set values of the drying control and the leading-end timing between summer and winter. Further, since paper is influenced by temperature and humidity, there are cases where it is necessary to adjust the control information 8 in accordance with the humidity and the temperature at the time of printing.

To meet such necessity, in the image forming apparatus 100, the control information 8 can be changed (adjusted). The operation panel 3 accepts an operation (a change starting operation) for starting to change the control information 8. "START" in FIG. 6 is a time point at which the controller 1 recognizes, based on the output of the operation panel 3, that a change starting operation has been performed.

The operation panel 3 accepts selection of a paper-type profile 6 of which the control information 8 is to be changed (step #31). In other words, the user selects, on the operation panel 3, a paper-type profile 6 of which the control information 8 he or she wishes to change. Based on the output of the operation panel 3, the controller 1 recognizes the paper-type profile 6 having been selected to change the control information 8 thereof.

Next, the operation panel 3 accepts selection of a control item of which the set value is to be changed (step #32). The user selects, on the operation panel 3, a control item of which the set value he or she wishes to change. Based on the output of the operation panel 3, the controller 1 recognizes the control item having been selected to change the set value thereof.

Then, the operation panel 3 accepts an input of a new set value (step #33). The user inputs, on the operation panel 3, the new set value for adjustment. Based on the output of the operation panel 3, the controller 1 recognizes the inputted set value.

The controller 1 changes the set value of the selected control item in the control information 8 of the selected paper-type profile 6 to the inputted set value (step #34). The controller 1 makes the storage medium 2 update the control information 8 of the selected paper-type profile 6.

Next, the controller 1 recognizes a paper-type profile 6 that belongs to the same device family as change data, the change data being the paper-type profile 6 of which the set value has been changed (step 35). Based on the device family name 80, the controller 1 extracts a paper-type profile 6 belonging to the same device family as the change data.

When there is found no paper-type profile 6 belonging to the same device family as the change data (No in step #36), the present flow ends (END). When there is found a paper-type profile 6 belonging to the same device family as the change data (Yes in step #36), the controller 1 performs synchronization processing (step #37). Then, the present flow ends (END).

In the synchronization processing, the controller 1 changes the set value included in the control information 8 of the recognized paper-type profile 6 to the value same as the set value of the control item having been changed in the change data. The controller 1 makes the storage medium 2 update the control information 8 of the same device family as the change data. It is possible to change the control information 8 of each of a plurality of paper-type profiles 6 by changing just one paper-type profile 6. There is no need of changing the set value of each of all paper types one by one. It is possible to update paper-type profiles 6 of paper types that are close to each other with respect to the set value in the control information 8.

Here, the operation panel 3 accepts an operation to set a mask item in a paper-type profile 6. The mask item is a control item which is not changed in the synchronization processing. When a set value in the control information 8 has been changed, the controller 1, with respect to the mask item, does not change the set value in the synchronization processing. This makes it possible to prevent a particular set value in the control information 8 from being changed in the synchronization processing.

(Paper Selection)

Next, with reference to FIG. 7 to FIG. 9, a description will be given of an example of paper selection in the image forming apparatus 100 according to the embodiment. In the image forming apparatus 100, before starting printing, it is necessary to select paper to be used for the printing. The controller 1 refers to the paper-type profile 6 corresponding to the selected paper. Then, the controller 1 adjusts the operation of the printing unit 4 based on the paper-type profile 6 that it has referred to. Thereby, it is possible to obtain a printed matter of a high image quality.

The operation panel 3 accepts an operation for displaying a paper selection screen 9. When the operation has been performed, the controller 1 makes the display panel 31 display the paper selection screen 9.

FIG. 7 is an example of a screen first displayed after the performance of the operation for displaying the paper selection screen 9. The controller 1 displays a registered paper list 91 in the paper selection screen 9. The registered paper list 91 is a list of (registered) types of paper of which paper-type profiles 6 are stored in the storage medium 2. The controller 1 displays the registered paper list 91 such that information about one paper type is displayed in one line. The information displayed in each line includes the name, the maker, the size, the presence/absence of coat, etc., of a type of paper. The information included in one line is not limited to these. The controller 1 reads the paper information 7 in each of the paper-type profiles 6 corresponding to the paper types to be displayed in the list. The controller 1 displays the registered paper list 91 by using the read information.

When the user has found, in the registered paper list 91, the type of paper that he or she has in mind, the user touches the line of the type of paper in the registered paper list 91. Thereby, the user can select paper to be used for printing. The operation panel 3 accepts the selection of paper to be used. The controller 1 recognizes the selected paper based on the touch position in the registered paper list 91. The controller 1 displays a list switching button 92 in the paper selection screen 9. The list switching button 92 is for switching the paper types displayed in the registered paper list 91.

Further, the controller 1 displays a first refine search menu 93 and a second refine search menu 94 in the paper selection screen 9. The first refine search menu 93 is for refining search based on the medium family. The second refine search menu 94 is for refining search based on the device family.

By using the first refine search menu 93, a medium family can be selected in a pull-down fashion. When a box at the right end of the first refine search menu 93 is touched, the controller 1 displays a list of medium family names 70. The user can select a medium family by touching the list. The controller 1 recognizes that the medium family corresponding to the touched medium family name 70 has been selected. When a medium family has been selected, the controller 1 extracts, of all the paper-type profiles 6, only those belonging to the selected medium family. Then, the controller 1 makes the display panel 31 display a registered paper list 91 that provides only the information about paper corresponding to the extracted paper-type profiles 6. The operation panel 3 accepts an operation to select one type of paper from the displayed list as an operation to select paper to be used for printing. The controller 1 recognizes the selected paper.

Further, by using the second refine search menu 94, a device family can be selected in a pull-down fashion. When a box at the right end of the second refine search menu 94 is touched, the controller 1 displays a list of device family names 80. The user can select a device family by touching the list. The controller 1 recognizes that the device family corresponding to the touched device family name 80 has been selected. When a device family has been selected, the controller 1 extracts, of all the paper-type profiles 6, only those belonging to the selected device family. Then, the controller 1 makes the display panel 31 display a registered paper list 91 that provides only the information about paper corresponding to the extracted paper-type profiles 6. FIG. 8 shows an example of a state where a search is refined by using the second refine search menu 94. The operation panel 3 accepts an operation to select one type of paper from the displayed list as an operation to select paper to be used for printing. The controller 1 recognizes the selected paper.

Further, it is possible to refine a search for a paper-type profile 6 (paper type) by using both the first refine search menu 93 and the second refine search menu 94. It is possible to refine a search for a paper-type profile 6 in terms of both the medium family and the device family. This makes it possible to quickly find a desired paper-type profile 6 (paper).

When a medium family has been selected by using the first refine search menu 93, and further a device family has been selected by using the second refine search menu 94, the controller 1 extracts, from all the paper-type profiles 6, only those that belong to both the selected medium family and the selected device family. Then, the controller 1 makes the display panel 31 display a registered paper list 91 that provides only the paper information included in the extracted paper-type profiles 6. FIG. 8 shows an example of a state where a search is double refined by using both the first refine search menu 93 and the second refine search menu 94, The operation panel 3 accepts an operation to select one type of paper from the displayed list as an operation to select paper to be used for printing. The controller 1 recognizes the selected paper.

Thus, the image forming apparatus 100 according to the embodiment includes the storage medium 2, an operation panel (the operation panel 3), the printing unit 4, and the controller 1. The storage medium 2 stores therein paper-type profiles 6, which are information about paper to be used, and which each include the paper information 7 and the control information 8. The operation panel accepts selection of a paper-type profile 6. The printing unit 4 performs printing on paper. The controller 1 operates the printing unit 4 based on the paper-type profile of paper selected on the operation panel. The paper information 7 is information indicating a paper characteristic. The control information 8 includes a set value of a control item for controlling the printing unit 4. The operation panel accepts an operation to make a selected paper-type profile 6 belong to a medium family based on the paper information 7. Further, the operation panel accepts an operation to make the selected paper-type profile 6 belong to a device family based on a unit of the control information 8. When the operation to make the selected paper-type profile 6 belong to a medium family has been performed, the controller 1 attaches, to the selected paper-type profile 6, information indicating the medium family to which the selected paper-type profile 6 belongs. When the operation to make the selected paper-type profile 6 belong to a device family has been performed, the controller 1 attaches, to the selected paper-type profile 6, information indicating the device family to which the selected paper-type profile 6 belongs.

The paper-type profiles 6 (profiles) can be grouped based on the paper information 7 (information indicating the paper characteristics) included in the paper-type profiles 6. The paper-type profiles 6 can be classified in terms of the paper characteristics. Further, the paper-type profiles 6 can be grouped based on the control information 8 (a printing control item) included in the paper-type profiles 6. The paper-type profiles 6 can also be classified in terms of similarity in printing control.

The operation panel accepts an operation to select a paper-type profile stored in the storage medium 2. The operation panel accepts an operation to change a set value included in the control information 8 of the selected paper-type profile 6. When a set value included in the control information 8 of the selected paper-type profile 6 has been changed, the controller 1 performs synchronization processing with respect to a paper-type profile 6 belonging to the same device family as change data, the change data being the paper-type profile 6 in which the set value has been changed. In the synchronization processing, the controller 1 changes the set value in the control information 8 of the paper-type profile 6 belonging to the same device family to the same value as the set value of a control item having been changed in the change data.

In synchronization with the change of the set value included in the control information 8, the set value in each of the paper-type profiles 6 belonging to the same device family can be changed all at once. For example, a set value included in the control information 8 may be changed in accordance with the seasons of the year, the temperature, and the humidity. Conventionally, the changing of a set value needs to be performed with respect to each paper-type profile 6 on a one-by-one basis, and this takes a lot of time. According to the present disclosure, the paper-type profiles 6 of such paper types as have the similar characteristics with respect to changes in temperature and in humidity can be included in the same device family. It is possible to simultaneously change the set value of the same control item in all the paper-type profiles 6 belonging to the same device family by changing the set value in one of the paper-type profiles 6 belonging to the device family.

The operation panel accepts an operation to set a mask item in the paper-type profiles 6, the mask item being a control item that is not changed in the synchronization processing. In a case where the set value of a control item has been changed, the controller 1 does not change the set value of the mask item in the synchronization processing. The user can select a set value (a control item) that he or she does not wish to be changed in the synchronization processing. A particular set value can be made unchangeable in the synchronization processing.

The image forming apparatus 100 includes the display panel 31 that displays a screen. The operation panel 3 accepts an operation to select a device family. The controller 1 makes the display panel 31 display a list of paper corresponding to paper-type profiles 6 belonging to the selected device family. The operation panel accepts an operation to select one type of paper from the displayed list as an operation to select paper to be used for printing. A list of paper having been classified in the selected device family can be displayed. Candidates, from which to select paper to be used for printing, can be narrowed down based on the device family.

The operation panel accepts an operation to select a medium family and a device family. The controller 1 makes the display panel 31 display a list of paper corresponding to paper-type profiles 6 that belong to both the selected medium family and the selected device family. The operation panel 3 accepts an operation to select one type of paper from the displayed list as an operation to select paper to be used for printing. It is possible to display a list of paper have been classified into both the selected medium family and the selected device family. Candidates from which paper for printing is to be selected can be narrowed down based on both the medium family and the device family.

The operation panel 3 accepts an operation to select only a medium family. The controller 1 makes the display panel 31 display a list of paper corresponding to paper-type profiles 6 belonging to the selected medium family. The operation panel 3 accepts an operation to select one type of paper from the displayed list as an operation to select paper to be used for printing. Candidates from which paper for printing is to be selected can be narrowed down based on the medium family.

When registering a new paper-type profile 6 in the storage medium 2, the controller 1 stores a default of the control information 8 in a region for storing the control information 8 in the paper-type profile 6. The new paper-type profile 6 can be registered without setting set values in the control information 8 of the new paper-type profile 6 one by one. For example, the default control information 8 can be automatically updated by making the newly registered paper-type profile 6 belong to one of the already existing device families, and then performing the synchronization processing.

The operation panel 3 accepts change of a set value included in the control information 8 of the newly registered paper-type profile 6. Based on the accepted change, the controller 1 makes the storage medium 2 change the set value in the control information 8 of the new paper-type profile 6. After the registration of the new paper-type profile 6, the set value in the control information 8 can be changed after checking the result of test printing.

The embodiments of the present disclosure described herein are not meant to limit the scope of the present disclosure in any manner. The present disclosure may be implemented by making various modifications thereto without departing from the spirit of the present disclosure. The present disclosure is usable in image forming apparatuses where a plurality of paper types are registered.

What is claimed is:

1. An image forming apparatus, comprising:
a storage medium which stores therein a paper-type profile which is information about paper to be used, the paper-type profile including both paper information and control information;
an operation panel which accepts selection of the paper-type profile; and
a controller which controls printing based on the paper-type profile of paper having been selected on the operation panel;
wherein
the paper information is information indicating a characteristic of paper,
the control information includes a set value of a control item for controlling printing,
the operation panel
accepts an operation to make the paper-type profile having been selected belong to a medium family, which is a group based on the paper information, and
accepts an operation to make the paper-type profile having been selected belong to a device family, which is a group based on a unit of the control information,
the controller
attaches, to the paper-type profile, information indicating the medium family to which the paper-type profile belongs, when the operation to make the paper-type profile belong to the medium family has been performed, and
attaches, to the paper-type profile, information indicating the device family to which the paper-type profile belongs, when the operation to make the paper-type profile belong to the device family has been performed,
the operation panel
accepts an operation to select the paper-type profile stored in the storage medium, and
accepts an operation to change the set value included in the control information of the paper-type profile having been selected,
when the set value in the control information of the paper-type profile having been selected has been changed, the controller
performs synchronization processing on the paper-type profile that belongs to a same device family as change data, the change data being the paper-type profile in which the set value has been changed, and
changes, in the synchronization processing, the set value in the control information of the paper-type profile belonging to the device family same as the device family to which the change data belongs to a value same as the set value of the control item having been changed in the change data,
the operation panel accepts an operation to set, in the paper-type profile, a mask item which is the control item that is not to be changed in the synchronization processing, and
when the set value of the control item has been changed, the controller does not change the set value of the mask item in the synchronization processing.

2. The image forming apparatus according to claim 1, further comprising a display panel which displays a screen, wherein
the operation panel accepts an operation to select the device family,
the controller makes the display panel display a list of paper corresponding to the paper-type profile belonging to the device family having been selected, and
the operation panel accepts an operation to select paper from the list of paper as an operation to select paper to be used for printing.

3. The image forming apparatus according to claim 2, wherein
the operation panel accepts an operation to select the medium family and the device family,
the controller makes the display panel display a list of paper corresponding to the paper-type profile that belongs to both the medium family having been selected and the device family having been selected, and
the operation panel accepts an operation to select paper from the list of paper as an operation to select paper to be used for printing.

4. The image forming apparatus according to claim 3, wherein
the operation panel accepts an operation to select only the medium family,
the controller makes the display panel display a list of paper corresponding to the paper-type profile that belongs to the medium family having been selected, and
the operation panel accepts an operation to select paper from the list of paper as an operation to select paper to be used for printing.

5. The image forming apparatus according to claim 1, wherein
when newly registering the paper-type profile in the storage medium, the controller stores a default of the control information in a region for storing the control information in the paper-type profile.

6. The image forming apparatus according to claim 5, wherein the operation panel accepts change of a set value in the control information of the paper-type profile having been newly registered, and based on the change having been accepted, the controller makes the storage medium change a set value in the control information of the paper-type profile having been newly registered.

7. A method for controlling an image forming apparatus, the method comprising:

storing a paper-type profile which is information about paper to be used and includes both paper information and control information;

accepting selection of the paper-type profile;

controlling printing based on the paper-type profile of selected paper;

the paper information being information that indicates a characteristic of paper;

the control information including a set value of a control item for printing;

accepting an operation to make the paper-type profile having been selected belong to a medium family, which is a group based on the paper information;

accepting an operation to make the paper-type profile having been selected belong to a device family, which is a group based on a unit of the control information;

attaching, to the paper-type profile, information indicating the medium family to which the paper-type profile belongs, when an operation to make the paper-type profile belong to the medium family has been performed;

attaching, to the paper-type profile, information indicating the device family to which the paper-type profile belongs, when an operation to make the paper-type profile belong to the device family has been performed, accepting an operation to select the paper-type profile stored, and accepting an operation to change the set value included in the control information of the paper-type profile selected, when the set value in the control information of the paper-type profile selected has been changed, performing synchronization processing on the paper-type profile that belongs to a same device family as change data, the change data being the paper-type profile in which the set value has been changed, and changing, in the synchronization processing, the set value in the control information of the paper-type profile belonging to the device family same as the device family to which the change data belongs to a value same as the set value of the control item changed in the change data, accepting an operation to set, in the paper-type profile, a mask item which is the control item that is not to be changed in the synchronization processing, and when the set value of the control item has been changed, not changing the set value of the mask item in the synchronization processing.

\* \* \* \* \*